June 12, 1951     A. J. LICHTY     2,557,035
ROOM HEATING AND COOLING UNIT

Filed July 21, 1947     2 Sheets—Sheet 1

INVENTOR.
Arthur J. Lichty
BY
Henry L. Jennings
Attorney

June 12, 1951   A. J. LICHTY   2,557,035
ROOM HEATING AND COOLING UNIT
Filed July 21, 1947   2 Sheets—Sheet 2
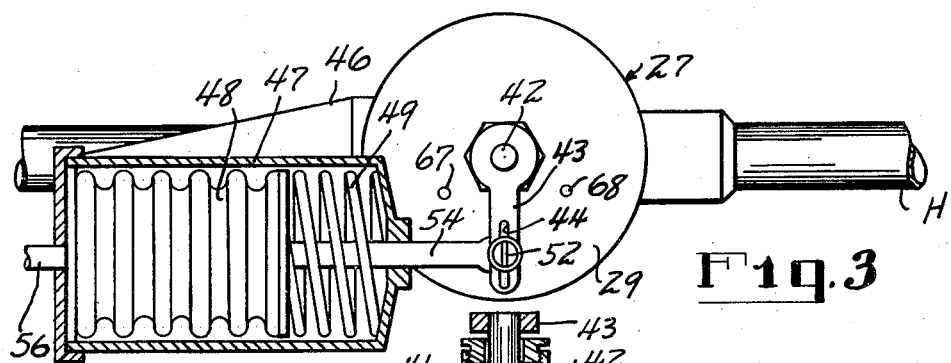
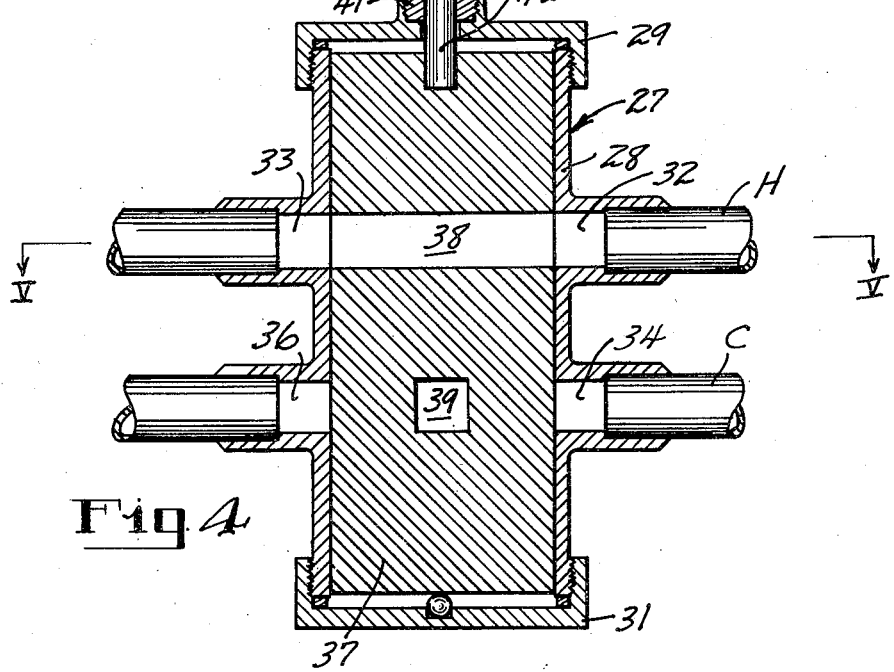
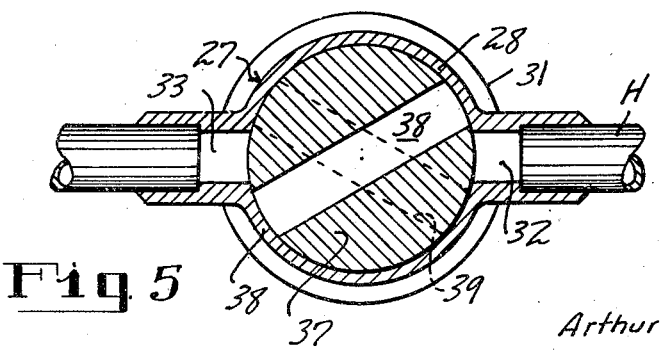
INVENTOR.
Arthur J. Lichty
BY
Attorney Patented June 12, 1951

2,557,035

UNITED STATES PATENT OFFICE 2,557,035

ROOM HEATING AND COOLING UNIT

Arthur J. Lichty, Birmingham, Ala.

Application July 21, 1947, Serial No. 762,476

3 Claims. (Cl. 257—3)

1

My present invention relates to a room heating and cooling unit, and has for an object the provision of apparatus of the character designated which shall be especially adapted for heating and cooling individual rooms in a multi-room building, such as office buildings, hotels, apartments and the like, and one which shall include means operable by the occupant of the room for controlling the temperature of the room within the range of the ordinary comfort zone for human occupancy at all seasons of the year.

Another object of my invention is to provide a room heating and cooling unit embodying separate coils through which heating or cooling media may be circulated, together with controls effective automatically and selectively to circulate either the hot or cold medium through the respective coils, thereby to maintain the room at the desired temperature as determined by a manual setting of certain of the controls.

A further object of my invention is to provide a unit of the character designated in which a single valve is utilized to control the flow of the hot or cold medium through the respective coils as determined by the setting of the controls therefor, and in which the single valve is so constructed and arranged that at no time during the operation will heating or cooling media flow simultaneously through the respective coils.

As is well known in the art to which my invention relates, in large multi-room buildings, the location of individual rooms in the building with respect to exposure to sunlight, shadow, and wind direction and velocity has a marked effect upon the extremes of temperature within the room. This effect is so great that in one part of a building heating may be required in order to maintain the desired room temperature at a given time, whereas in another part of the same building, with more exposure to the sun, at the same given time, it may be necessary to cool some of the rooms to maintain the desired temperature. In order to overcome this difficulty, it has been proposed to provide heating and cooling systems embodying means to separate the building into zones according to sun and shadow exposure and prevailing temperatures, and to provide means for circulating a heating medium through the units located in the cool zone, and at the same time to circulate a cooling medium through the units located in the warmer zone of the building. Where a building is divided into such zones, and with the temperatures varying throughout the day, it requires the services of highly skilled operators to maintain a comfortable temperature in the individual rooms

2 thereof. It is a principal object of my invention, therefore, to provide an apparatus whereby either hot or cold media may be circulated through the unit located in any given room, regardless of the location of the room within the building, by means automatically operable responsive to a manual setting of the controls by the occupant of the room, thereby to maintain the desired predetermined temperature in each room.

Apparatus embodying features of my invention is illustrated in the accompanying drawings, forming a part of this application, in which:

Fig. 3 is a plan view of the valve for controlling the flow of the heating or cooling medium through the respective heating or cooling coils;

Fig. 4 is a detail sectional view of the valve;

Fig. 5 is a sectional view taken generally along the line V—V of Fig. 4 and showing the valve in neutral or closed position; and, Fig. 6 is a detail view of the valve control mechanism.

Figure 1:
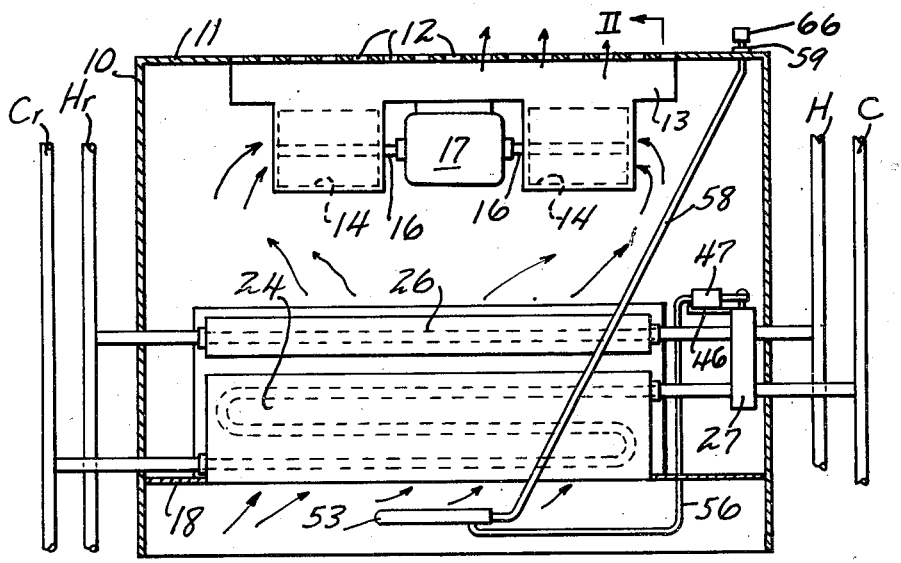
Fig. 1 is a sectional view through a room heating and cooling unit showing my improved controls in elevation.
Figure 2:
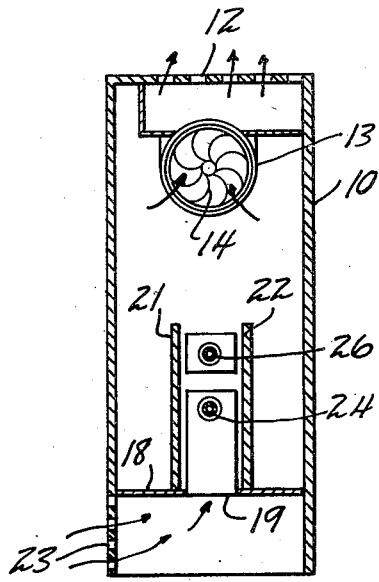
Fig. 2 is a sectional view taken along line II—II of Fig. 1.
Figure 6:
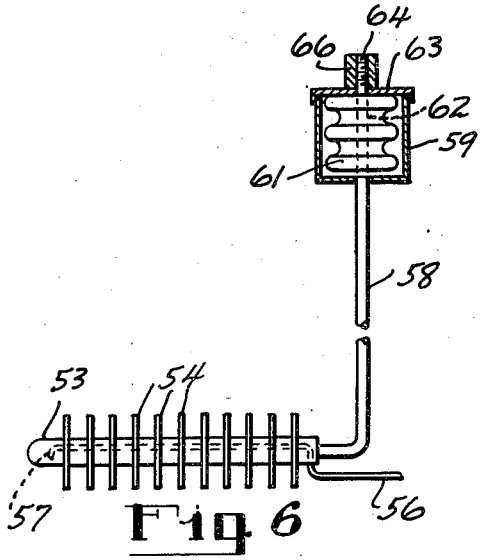

Referring now to the drawings for a better understanding of my invention, I show in Fig. 1 a housing 10 having a top 11 with grilled openings 12 therein. Disposed in the housing immediately beneath the grilled openings 12 is a fan casing 13. Mounted in each end of the casing 13 is an impeller type circulating fan 14, the shafts 16 of which are driven by a motor 17.

Adjacent the bottom of the housing 10 is an intermediate wall 18 having an opening 19 therein. Extending upwardly from the opening 19 are baffles 21 and 22, and beneath the intermediate 18 the casing 10 is provided with other grilled openings 23. Disposed above the opening 19 is a heat absorption unit in the form of a coil 24 through which is adapted to be circulated a cooling medium, such for instance as cool water, and above the coil 24 is a heat transfer unit in the form of a coil 26 through which is adapted to be circulated a heating medium, such for instance as hot water. The fans 14 are thus disposed to draw air in the room through the grilled openings 23, the openings 19, upwardly past the coils 24 and 26, and thence to discharge the same through the grilled openings 12 at the top of the housing. The apparatus described above is illustrative of that well known in the art to which my invention relates and forms no part of my invention. The objects of my invention are realized by the apparatus for effecting the circulation of the required hot or cool medium through the respective coils 24 and 26 as required, which apparatus will now be described.

Referring more particularly to Fig. 1, I show a conduit H for a supply of circulating heating medium, preferably hot water. On the same side of the housing 10 as the conduit H, I show another conduit C for a supply of circulating cool medium, preferably cool water. On the opposite side of the housing, I show a conduit Hr representing the return line for the heating medium, and at Cr I show a return conduit for the circulating cool medium. The means for circulating heating and cooling media throughout a building for heating and cooling the same are well known and require no further illustration. In accordance with my invention, I provide a supply conduit for both a heating and a cooling medium, and return conduits for both heating and cooling media.

Located at one end of the coils 24 and 26 is a valve 27 for selectively controlling the flow of the heating or cooling medium through the respective coils. As best shown in Figs. 3, 4 and 5, the valve 27 comprises a casing 28 closed at each end by caps 29 and 31. The valve casing 28 is provided with diametrically disposed inlet and outlet openings 32 and 33 for connecting the conduit H with the inlet of the coil 26. Other inlet and outlet connections 34 and 36 are provided for connecting the conduit C with the inlet of the coil 24. Disposed within the casing 28 is a rotatable body portion 37 which is provided with a squared port 38 disposed to connect the conduit H with the coil 26 by cross-connecting the connections 32 and 33 when the body portion 37 is in one position. The body 37 is provided with another squared port 39, angularly disposed with respect to the opening 38, and adapted when the body is in one position to connect the conduit C with the coil 24 by cross connecting the connections 34 and 36.

The cap 29 is provided with a packing gland 41 through which passes a stem 42 secured to the body portion 37. Connected to the projecting end of the operating stem 42 is a crank arm 43, slotted at its outer end as indicated at 44. Mounted on a bracket 46 carried by the valve 27 is a housing 47 within which is mounted an expansible bellows 48. A spring 49 is interposed between an end of the bellows 48 and an end of the housing 47, and the bellows is provided with a projecting pin 54. The pin 54 is slidably secured by means of a screw 52 to the slotted end 44 of the arm 43.

Mounted in the lower part of the casing 10 in the path of the moving air drawn therethrough by the fans 14 is a temperature responsive device comprising an elongated tube 53 having fins 54 thereon. The tube 53 contains a volatile liquid having a boiling point within the range of temperature to be controlled. The tube 53 may be disposed horizontally and has therein a small conduit 56 connected to the expansible bellows 48 controlling the valve 27. The inner end of the conduit 56 may be turned downwardly as indicated at 57 so that it is at all times covered with the liquid in the tube 53. Another conduit 58 leads from the tube 53 to a relatively small chamber 59, preferably located on top of the casing 10 within reach of the occupant of the room. Within the casing 59 is a small expansible bellows 61. A rod 62 extends downwardly through the cover 63 of the chamber 59 and connects to the lower end of the bellows 61. The rod is provided at its upper end with a threaded portion 64 and an adjusting nut 66 cooperates with the threaded portion to determine the elongation of the bellows 61 and accordingly the pressure within the tube 58 and the conduit 56. By this means, the pressure acting within the expansible bellows 48 may be varied and the medium to be circulated through the respective coil 24 or 26 is selected and automatically controlled by changes in room temperature.

From the foregoing, the operation of my improved apparatus will be readily understood. During cold seasons of the year, that is, when the outside temperature is in the neighborhood of 50° F. or lower, it will be unnecessary to circulate a cooling medium through the conduit C. Likewise, during warm seasons of the year when the temperature is in the neighborhood of 85° F. or higher, it will not be necessary to circulate a heating medium through the conduit H. It is during the season of the year when the temperature fluctuates between warm and cool and when the effect of sun, shadow, and wind has a tendency to vary the desired room temperature, that my invention finds its greatest usefulness.

Assuming that the adjusting nut 66 is set for the desired temperature by the occupant of the room, that the body portion 37 of valve 27 is in neutral position as shown in Fig. 5, and that the temperature of the room rises. The pressure within the sealed tube 53 rises responsive to the higher room temperature, expanding bellows 48 and rotating the body portion 37 of the valve 27 counterclockwise as viewed in Figs. 3 and 5, compressing the spring 49. The conduit C is gradually connected to the coil 24 by the port 39 moving into registry with respect to the inlet and outlet openings 34 and 36, thus admitting cool water to coil 24. Responsive to admission of cool water to coil 24 the room temperature drops, whereupon the bellows 48 contracts and spring 49 moves the valve body clockwise, shutting off conduit C from coil 24, and gradually connecting conduit H to coil 26. To prevent the body from rotating too far in either direction, I may provide stop pins 67 and 68 for engaging the crank arm 43.

It is to be especially noted that the ports 38 and 39 are angularly disposed with respect to each other so that the port 39 is fully closed before the port 38 commences to open, and vice versa. This delay between the closing and opening of the respective ports permits the fan to extract either the heat from the coil 26 by moving air thereover, or it permits the coil 24 to absorb heat from the moving air, thus permitting the water in the coils to be brought approximately to room temperature before additional hot or cool water is admitted to either coil. Likewise, it will be apparent that this disposition of the ports 38 and 39 precludes the possibility that hot or cool water will flow in the coils simultaneously. Also, I prefer to make the ports 38 and 39 and the inlet and outlet openings 32—33 and 34—36 square in cross section in order that the same increment of angular movement of the valve body 37 will produce the same volume of flow within the conduits C and H for each increment of change of temperature throughout the entire scale of control.

From the foregoing, it will be apparent that I have devised an improved heating and cooling unit especially adapted for use in individual rooms of a multi-room building in which the controls therefor are automatically responsive to maintain the room at a given temperature as determined by a simple setting of the controls. It will be further apparent the particular arrangement of the valve shown herein affords a delay between the admission of heating and cooling media so that the temperature of the room is always maintained closely at the value determined by the setting of the adjusting nut 66.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In apparatus for maintaining a room at a predetermined temperature, a housing, a heat transfer coil in the housing, a heat absorption coil in the housing, a valve embodying a casing connected to the inlet of said coils, separate conduits for heating and cooling media connected to the casing, a rotary body in the casing, there being ports through the body portion rectangular in cross section and angularly disposed with respect to each other to selectively connect the heat transfer and heat absorption coils to their respective conduits, a temperature responsive device operable upon a change in room temperature from said predetermined temperature to rotate the body portion thereby to admit the heating and cooling media selectively to their respective coils, and means to set the temperature responsive device for actuation upon variations of temperature from said predetermined temperature.

2. In apparatus for maintaining a room at a predetermined temperature, a housing, a fan disposed to circulate air through the housing, heating and cooling coils disposed in the housing in position for air to be drawn thereover by said fan, conduits for delivering heating and cooling media to their respective coils, a single rotary valve controlling admission of the media to the coils, there being a pair of ports in the valve angularly disposed with respect to each other for selectively admitting the media to the coils, an expansible bellows disposed to actuate the valve, a temperature responsive device connected to the bellows for expanding and contracting the same when the room temperature varies from said predetermined temperature, and a manual control for the temperature responsive device for setting the same at said predetermined temperature.

3. In apparatus for maintaining a room at a predetermined temperature, a heat transfer unit, a conduit for introducing a heating medium into said unit, a heat absorption unit, a conduit for introducing a cooling medium into said heat absorption unit, a single valve mechanism having a housing associated with both conduits and both units and having inlet openings therein rectangular in cross section through which the heating and cooling media are admitted, a movable valve body having ports therein rectangular in cross section coacting with the inlet openings of the housing whereby equal increments of movement of the body produce equal changes of flow of heating and cooling media through the respective units and control selectively and at spaced intervals of time the introduction of the heating and cooling media into their respective units, and a single mechanism responsive to variations in room temperature from said predeterined temperature to actuate the valve mechanism.

ARTHUR J. LICHTY.

REFERENCES CITED

The following references are of record in the file of this patent:

UNITED STATES PATENTS

| Number | Name | Date |
| --- | --- | --- |
| 2,110,367 | Knudson | Mar. 8, 1938 |
| 2,125,889 | Crump | Aug. 9, 1938 |
| 2,175,150 | Eggleston | Oct. 3, 1939 |

FOREIGN PATENTS

| Number | Country | Date |
| --- | --- | --- |
| 594,280 | Germany | Apr. 6, 1934 |